United States Patent
Abelha Ferreira et al.

(10) Patent No.: US 11,790,039 B2
(45) Date of Patent: Oct. 17, 2023

(54) COMPRESSION SWITCHING FOR FEDERATED LEARNING

(71) Applicant: EMC IP Holding Company LLC, Hopkinton, MA (US)

(72) Inventors: Paulo Abelha Ferreira, Rio de Janeiro (BR); Pablo Nascimento Da Silva, Niterói (BR); Tiago Salviano Calmon, Rio de Janeiro (BR); Roberto Nery Stelling Neto, Rio de Janeiro (BR); Vinicius Michel Gottin, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 548 days.

(21) Appl. No.: 17/083,459

(22) Filed: Oct. 29, 2020

(65) Prior Publication Data
US 2022/0138498 A1 May 5, 2022

(51) Int. Cl.
*H04L 43/0817* (2022.01)
*H04L 43/16* (2022.01)
(Continued)

(52) U.S. Cl.
CPC ........ *G06F 18/2148* (2023.01); *G06F 18/217* (2023.01); *G06F 18/29* (2023.01); *H04L 43/0817* (2013.01); *H04L 43/16* (2013.01)

(58) Field of Classification Search
None
See application file for complete search history.

(56) References Cited

U.S. PATENT DOCUMENTS

| 2019/0220703 A1* | 7/2019 | Prakash | G06V 10/95 |
| 2022/0004932 A1* | 1/2022 | Gu | G06F 30/27 |

(Continued)

FOREIGN PATENT DOCUMENTS

| CN | 110490323 A | * | 11/2019 | |
| DE | 102021122617 A1 | * | 3/2022 | G06N 3/0445 |
| WO | WO-2020115273 A1 | * | 6/2020 | G06K 9/6257 |

OTHER PUBLICATIONS

H. Brendan McMahan et al.; "Communication-Efficient Learning of Deep Networks from Decentralized Data"; Proceedings of the 20th International Conference on Artificial Intelligence and Statistics, Proceedings of Machine Learning Research (PMLR); vol. 54; pp. 1273-1282; 2017 (http://proceedings.mlr.press/v54/mcmahan17a.html).

(Continued)

*Primary Examiner* — Mohammed Rachedine
(74) *Attorney, Agent, or Firm* — Chamberlain, Hrdlicka, White, Williams, & Aughtry (57) ABSTRACT

Methods for compression switching that includes distributing a model to client nodes, which use the model to generate a gradient vector (GV) based on a client node data set. The method includes receiving a model update that includes a gradient sign vector (GSV) based on the gradient vector; generating an updated model using the GSV; and distributing the updated model to the client nodes. The client node uses the updated model to generate a second GV based on a second client node data set. The method also includes a determination that a compression switch condition exists; based on the determination, transmitting an instruction to the client node to perform a compression switch; receiving, in response to the instruction, another model update including a subset GSV based on the second gradient vector; gener- (Continued)

ating a second updated model using the subset GSV; and distributing the second updated model to the client nodes.

20 Claims, 7 Drawing Sheets (51) Int. Cl.
*H04L 41/147* (2022.01)
*H04L 41/0895* (2022.01)
*H04L 41/082* (2022.01)
*H04L 41/14* (2022.01)
*G06F 18/214* (2023.01)
*G06F 18/20* (2023.01)
*G06F 18/21* (2023.01)

(56) References Cited

U.S. PATENT DOCUMENTS

| | | | | |
|---|---|---|---|---|
| 2022/0414464 | A1* | 12/2022 | Krishnaswamy | G06N 3/047 |
| 2023/0036702 | A1* | 2/2023 | Reisser | G06N 3/045 |
| 2023/0046255 | A1* | 2/2023 | Ferland | H04L 63/0414 |
| 2023/0116117 | A1* | 4/2023 | Shao | G06N 3/098 |
| | | | | 706/25 |
| 2023/0146099 | A1* | 5/2023 | Ouyang | H04L 41/16 |
| | | | | 709/223 |

OTHER PUBLICATIONS

Ian Goodfellow, Yoshua Bengio, and Aaron Courville; "Deep Learning"; MIT Press; 2016.
Jeremy Bernstein et al.; "signSGD: Compressed Optimisation for Non-Convex Problems"; arXiv:1802.04434v3; Aug. 7, 2018.
Nitish Srivastava et al.; "Dropout: A Simple Way to Prevent Neural Networks from Overfitting"; The Journal of Machine Learning Research; vol. 15; pp. 1929-1958; 2014 (https://dl.acm.org/doi/abs/10.5555/2627435.2670313).
Shai Shalev-Shwartz and Shai Ben-David; "Understanding Machine Learning: From Theory to Algorithms"; Cambridge University Press, 2014 (https://www.cs.huji.ac.il/~shais/UnderstandingMachineLearning/understanding-machine-learning-theory-algorithms.pdf).

* cited by examiner

COMPRESSION SWITCHING FOR FEDERATED LEARNING

BACKGROUND

Computing devices often exist in environments that include many such devices (e.g., servers, virtualization environments, storage devices, mobile devices network devices, etc.). Machine learning algorithms may be deployed in such environments to, in part, assess data generated by or otherwise related to such computing devices. Such algorithms may be applied to data that cannot or should not be transmitted beyond the boundaries of the environment. Such constraints on data transmission may reduce or prevent machine-learning algorithms deployed in the environment from benefitting from training of the algorithm in other environments.

SUMMARY

In general, embodiments described herein relate to a method for compression switching during model training. The method may include: distributing, by a model coordinator, a current model to a plurality of client nodes that includes a client node. The client node may use the current model to generate a gradient vector based on a client node data set. The method may also include receiving, from the client node, a first model update that includes a gradient sign vector based on the gradient vector; generating, by the model coordinator, a first updated model using the gradient sign vector; and distributing the first updated model to the plurality of client nodes. The client node may use the first updated model to generate a second gradient vector based on a second client node data set. The method may also include making a first determination, by the model coordinator and after distributing the first updated model, that a compression switch condition exists corresponding to the client node; based on the first determination, transmitting, from the model coordinator, an instruction to the client node to perform a compression switch; receiving, by the model coordinator, from the client node, and in response to the instruction, a second model update comprising a gradient sign subset vector based on the second gradient vector; generating, by the model coordinator, a second updated model using the gradient sign subset vector; and distributing the second updated model to the plurality of client nodes.

In general, embodiments described herein relate to a non-transitory computer readable medium that includes computer readable program code, which when executed by a computer processor enables the computer processor to perform a method for compression switching during model training. The method may include distributing, by a model coordinator, a current model to a plurality of client nodes that includes a client node. The client node may use the current model to generate a gradient vector based on a client node data set. The method may also include receiving, from the client node, a first model update that includes a gradient sign vector based on the gradient vector; generating, by the model coordinator, a first updated model using the gradient sign vector; and distributing the first updated model to the plurality of client nodes. The client node may use the first updated model to generate a second gradient vector based on a second client node data set. The method may also include making a first determination, by the model coordinator and after distributing the first updated model, that a compression switch condition exists corresponding to the client node; based on the first determination, transmitting, from the model coordinator, an instruction to the client node to perform a compression switch; receiving, by the model coordinator, from the client node, and in response to the instruction, a second model update comprising a gradient sign subset vector based on the second gradient vector; generating, by the model coordinator, a second updated model using the gradient sign subset vector; and distributing the second updated model to the plurality of client nodes.

In general, embodiments described herein relate to a system for compression switching during model training. The system may include a model coordinator, executing on a processor comprising circuitry. The model may be configured to distribute a current model to a plurality of client nodes that includes a client node. The client node may use the current model to generate a gradient vector based on a client node data set; receive, from the client node, a first model update that includes a gradient sign vector based on the gradient vector; generate a first updated model using the gradient sign vector; and distribute the first updated model to the plurality of client nodes. The client node may use the first updated model to generate a second gradient vector based on a second client node data set; make a first determination, after distributing the first updated model, that a compression switch condition exists corresponding to the client node; transmit, based on the first determination, an instruction to the client node to perform a compression switch; receive, from the client node, and in response to the instruction, a second model update that includes a gradient sign subset vector based on the second gradient vector; generate a second updated model using the gradient sign subset vector; and distribute the second updated model to the plurality of client nodes.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for training models (e.g., machine learning algorithms) using, and that will be used by, various nodes that are operatively connected to a model coordinator. In one or more embodiments, a node (e.g., a client node) is any set of one or more computing devices (or portions therein) that are operatively connected to one another, on which one or more models are being used to predict outputs/outcomes based on input data.

There may be any amount of such input data organized in any way to contribute to variables/factors that may be assessed or otherwise used by a model. In one or more embodiments, prior to using a given version of a model, the model must be trained using a training data set. In one or more embodiments, a training data set exists on and/or is otherwise obtained by client nodes that relates to a given set of one or more outcomes that are to be predicted. For example, a given client node may have data relating to facial recognition, software use, browsing behavior, storage device performance, storage backup performance, mobile device use, etc.

In one or more embodiments, a model coordinator is operatively connected to any number of client nodes, each having a data set that a given for which a given model may be relevant. In one or more embodiments, a model coordinator may distribute a model to any or all of the client nodes to be trained using data present on or otherwise available to the client nodes. For example, each node may have available a data set that includes inputs coupled to resulting outputs that are known to be correct. At least a portion of such a data set for a given client node may be used to train a model (e.g., machine learning algorithm) to more correctly predict any number of outputs based any number of inputs (e.g., future inputs for which the output is not already known). For example, if the node is arranged as neural network with any number of layers, a backpropagation algorithm may be used, such as a gradient descent algorithm, to train the neural network to predict future outcomes based on future inputs.

In such an algorithm, an initial model is used to set initial weights assigned to interconnections between components in different layers of the network. In one or more embodiments, the training data will be used with the algorithm starting at the output layer, and propagating back through the network one layer at a time until the input layer is reached, calculating the gradients (e.g., derivatives) along the way, which are used to inform the weights assigned to the variables/factors of the function being analyzed by the algorithm.

In one or more embodiments, the outcome of such training is a gradient vector, with a value (i.e., a gradient, which may be considered a partial derivative of the function for a given variable/factor) corresponding to each variable arranged as a vector. In one or more embodiments, each variable gradient value is located at a specific place (i.e., index location) within the gradient vector, and may be a positive or negative value.

In one or more embodiments, training of a model within a given client node may result in a model that fits well for the data set of that node, but that may not generalize as well to data sets for which the outcome is not already known and/or are available to other client nodes. In one or more embodiments, such a scenario is referred to as overfitting. Accordingly, it may be advantageous to aggregate the results from a number of different client nodes using the same model for their own data sets to determine a model that generalizes well to new data sets related to the same problem or data type.

In one or more embodiments, such an aggregated model may be achieved via a federated learning model. In one or more embodiments, in a federated learning model, a model coordinator operatively connected to each client node in the federation of client nodes receives the results of the training from the client nodes, and uses the aggregate set of results to update a central model, which is then re-distributed to the client nodes for further training and/or use. In one or more embodiments, the process is repeated until a given training session is complete, and each client node has a copy of the model produced by the model coordinator during the training session. In one or more embodiments, the use of training results from more than one client node increases the likelihood that the resulting model will be able to correctly predict outputs for a set of future inputs obtained by each client node. Said another way, the resulting model will generalize well.

In one or more embodiments, the client nodes are each provided with a current model from the model coordinator (which may be randomized if the cycle is an initial cycle). Each client node receiving the current model from the model coordinator may then train the model using its own local training data. In one or more embodiments, the results of the training of each nodes are model updates (e.g., a gradient vector). In one or more embodiments, the client nodes transmit the model updates to the model coordinator. In one or more embodiments, the model coordinator aggregates the model updates and uses them to generate an updated model. In one or more embodiments, one such execution of federated learning is referred to as a cycle. In one or more embodiments, the training continues for a pre-defined number of cycles, or until some level of correct prediction ability is achieved. In one or more embodiments, the set of cycles is a training session for the model, which may also be referred to as an epoch.

However, certain scenarios may exist where the actual values of a gradient vector produced from a model training on a given one or more client nodes cannot (or should not) be shared with the model coordinator. Examples of such scenarios include, but are not limited to, low network bandwidth, data privacy concerns, energy constraints, etc. Additionally, the model training results from any given client node may detract from the ability of the updated model generated by the model coordinator to generalize to future data sets as a result of overfitting to the training data set of the client node.

Embodiments described herein address, at least in part, the aforementioned problems using compression techniques, and the ability to switch between compression techniques when certain conditions are detected (i.e., a compression switch condition exists).

In one or more embodiments, a first level of compression is achieved by having the client nodes not send the actual gradient vector produced as a result of the training session performed on the client node. Instead, in one or more embodiments, a vector of the same number of elements is sent, but which only includes of the signs (i.e., positive or negative) of each gradient in the gradient vector, which may be referred to as a gradient sign vector. In one or more embodiments, a gradient sign vector effectively eliminates the transmission of any data from the client nodes, and instead the model coordinator only receives a portion of the results of the training of the model on the client nodes, thereby addressing potential data privacy concerns. Additionally, transmission of the signs of values rather than the actual values reduces the amount of data being sent, and thereby the network bandwidth necessary to transmit the results. For example, if a gradient vector included 1,000,000 gradients, and each were transmitted represented using a 32 bit value, then 32,000,000 bits of information would be transmitted to the model coordinator from a given client node. If, instead, a single bit representing the sign of the value was transmitted (e.g., 0 for negative and 1 for positive), then the number of bits transmitted to the model coordinator from a given client node is reduced by a factor of 32.

In one or more embodiments, such a compression scheme may be referred to as sign compression. In one or more embodiments, sign compression reduces the amount of information being transmitted, eliminates the need for client node data to be transmitted out of the client node, and results in a similar or at least acceptable level of prediction accuracy as the actual gradient vector having been sent.

In one or more embodiments, the gradient sign vectors from the client nodes are received by the model coordinator. In one or more embodiments, the model coordinator applies a scaling factor to the signs of the gradient sign vectors. The scaling factor may be pre-determined, and may be based, at least in part on the type of data relevant to the model being trained. For example, a set of values representing positive and negative gradients of a given gradient vector may have a scaling factor of 0.1 applied, thereby making each value negative 0.1 or positive 0.1.

In one or more embodiments, the model coordinator then takes the scaled value at each index position within the vector from each of the scaled gradient sign vectors, and determines an average value for the set of scaled values at each index position. In one or more embodiments, the resulting set of averages for each index position represent an updated model, which may be distributed to the client nodes for continued training, or for use if the training has completed (e.g., the epoch has ended).

However, conditions may exist that become known to the model coordinator that necessitate a switch from a sign compressor scheme to a compression scheme that even further compresses the amount of information communicated as results of the model training from the client nodes. For example, the model coordinator may determine that the resulting updated model is overfitting, and thus leading to larger validation errors. As another example, the model coordinator may detect that low bandwidth conditions exist for some or all of the network connections between the client nodes and the model coordinator.

In such scenarios, the model coordinator may communicate to the client nodes to begin using a different compression scheme for the next and future cycles of the training session. In one or more embodiments, additional compression is achieved by providing each client node with the same shared random seed with which to determine values within the gradient sign vector to not include in the information sent to the model coordinator after a training cycle. Knowing the random seed, the model coordinator may generate gradient sign subset vectors from the client nodes, and be aware of which positions in the vector were dropped by the client nodes based on the shared random seed. In one or more embodiments, this allows the model coordinator to perform the model update using the values that it did receive from the client nodes, as the model coordinator knows the index position within the vector that each value would have if the entire gradient sign vector had been sent, thereby allowing gradient sign subset vectors to be used in the updating of a model during a given training session cycle.

In one or more embodiments, having client nodes send a gradient sign subset vector instead of a gradient sign vector has a variety of benefits. Such benefits include, but are not limited to: (i) the data privacy concerns addressed by the sign compression remain addressed; (ii) the inclusion of only certain pseudo randomly selected signs of a gradient sign vector may increase the ability of the updated model to generalize to future data, as it is less likely that the updated model will be adversely affected by overfitting; and (iii) the amount of information being transmitted to the model coordinator is further reduced, thereby helping to address lower bandwidth scenarios. In one or more embodiments, the amount of information being transmitted in a gradient sign subset vector is a fraction (e.g., 10%) of the entire gradient sign vector, which may be controlled via the random seed provided to the client nodes. Accordingly the factor by which amount of information being sent from a client node to the model coordinator is the reduction factor of achieved by the sign gradient factor (e.g., reduced by a factor of 32) multiplied by the reduction factor achieved by sending only a subset of the signs (e.g., sending only 10% of the signs would multiply the reduction factor by 10).

Systems and methods for the compression models (which may be referred to herein as compressors), for detecting conditions that trigger a switch between compressors, and performing the compressor switches, are discussed further in the below description of the figures.

Figure 1A:
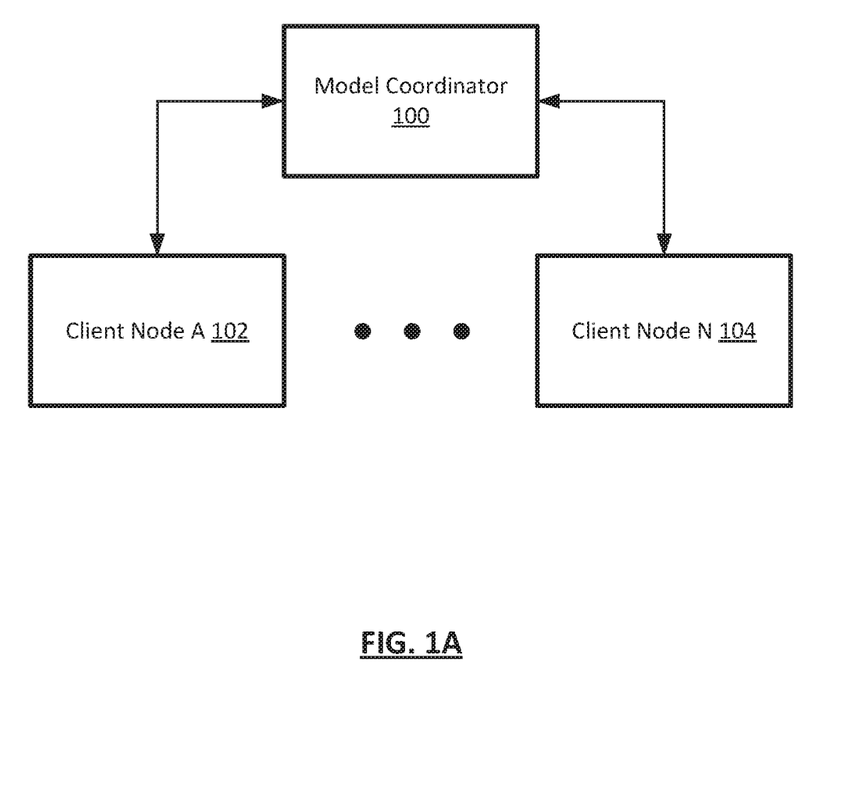
FIG. 1A shows a diagram of a system in accordance with one or more embodiments of the invention.

FIG. 1A shows a diagram of a system in accordance with one or more embodiments described herein. The system may include a model coordinator (100) operatively connected to any number of client nodes (e.g., client node A (102), client node N (104)). Each of these components is described below.

In one or more embodiments, the client nodes (102, 104) may be computing devices. In one or more embodiments, as used herein, a client node (102, 104) is any computing device, collection of computing devices, portion of one or more computing devices, or any other logical grouping of computing resources (e.g., a neural network).

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements.

In one or more embodiments, any or all of the aforementioned examples may be combined to create a system of such devices, which may collectively be referred to as a computing device or client node (102, 104). Other types of computing devices may be used without departing from the scope of the invention. In one or more embodiments, a set of computing devices may form all or a portion of a data domain, all or part of which may require being migrated (e.g., re-located, backed-up, etc.) from time to time (e.g., upon request and/or pursuant to a defined schedule). In one or more embodiments, a data domain is any set of computing devices for which migration services are performed, such as, for example, data backup, disaster recovery, backup data deduplication, re-location to updated/newer computing devices, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the system also includes a model coordinator (100). In one or more embodiments, the model coordinator (100) is operatively connected to the client nodes (102, 104). A model coordinator (100) may be separate from and connected to any number of client nodes (102, 104). In one or more embodiments, the model coordinator (100) is a computing device.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The model coordinator (100), and components therein, are discussed further in the description of FIG. 1B, below.

In one or more embodiments, the client nodes (102, 104) and the model coordinator (100) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
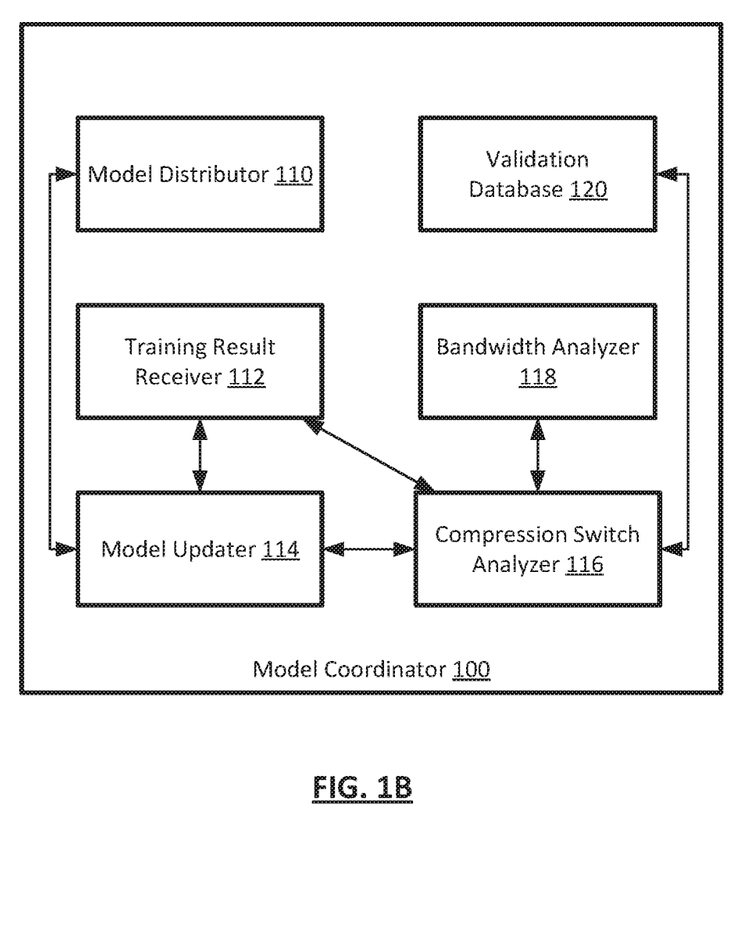
FIG. 1B shows a diagram of a model coordinator in accordance with one or more embodiments of the invention.

FIG. 1B shows a diagram of a model coordinator (100) in accordance with one or more embodiments described herein. The model coordinator (100) may include any number of components. As shown in FIG. 1B, the model coordinator (100) includes a model distributor (110), an training result receiver (112), a model updater (114), a compression switch analyzer (116), a bandwidth analyzer (118), and a validation database (120) Each of these components is described below.

In one or more embodiments, a model coordinator (100) is a computing device, as discussed above in the description of FIG. 1A.

In one or more embodiments, the model coordinator (100) includes a model distributor (110). In one or more embodiments, a model distributor (110) is any hardware (e.g., circuitry), software, firmware, or any combination thereof that includes functionality to distribute models (e.g., updated models) generated by the model coordinator (100). In one or more embodiments, such a model may be transmitted via one or more network interfaces (not shown), and may be distributed on a recurring basis as part of a model training session. In one or more embodiments, the model distributed may be a gradient vector representing the results of aggregating model updates (i.e., gradient sign vectors or gradient sign subset vectors) received from client nodes. In one or more embodiments, the model distributor (110) may also distribute any other information relevant to the model being distributed. For example, at the beginning of a training session, the model distributor (110) may distribute to the client nodes one or more random seeds for use if/when the model coordinator determines that the client nodes should switch from one compressor (e.g., a sign compressor) to another compressor (e.g., a sign subset compressor). Such additional information may additionally or alternatively be sent at any point during a training session being conducted by the model coordinator (100) and client nodes.

In one or more embodiments, the model coordinator (100) includes a training results receiver (112). In one or more embodiments, training results receiver (112) is any hardware (e.g., circuitry), software, firmware, or any combination thereof that includes functionality to obtain/receive model updates from client nodes. In one or more embodiments, model updates are obtained in any manner capable of collecting data from or about computing devices (e.g., via, at least in part, one or more network interfaces of the model coordinator (100)).

Such model updates may include, from any number of client nodes, gradient sign vectors and/or gradient sign subset vectors that are a representation of the results of the model training performed by the client nodes. As described above, a gradient sign vector may be a vector with a set of single bit values, each representing the sign of one of the gradients of the gradient vector resulting from a model training cycle performed by a client node. As also described above, a gradient sign subset vector may be a subset of values representing a subset of the signs of gradients in such a gradient vector, with the subset depending, at least in part, on a random seed provided by and/or commonly known by the set of relevant client nodes and the model coordinator (100).

In one or more embodiments, the model coordinator (100) includes a model updater (114) operatively connected to the aforementioned model distributor (110) and the training results receiver (112). In one or more embodiments, a model updater (114) is any hardware (e.g., circuitry), software, firmware, or any combination thereof that includes functionality to use model updates received via the training results receiver (112) to update a model during a training session to be distributed back to client nodes via a model distributor (110). In one or more embodiments, updating a model includes assessing a set of model updates, assessing the index positions within the gradient sign vectors (or gradient subset vectors) that represent the model updates, and for each index position having non-null values in the set of such vectors, averaging the values produced via application of a scaling factor to generate a model update. The function of the model updater (114) is discussed further in the description of FIG. 2A and FIG. 2B, below.

In one or more embodiments, the model coordinator (100) includes a compression switch analyzer (116) operatively connected to the model updater (114) and the training results receiver (112). In one or more embodiments, a compression switch analyzer (116) is any hardware (e.g., circuitry), software, firmware, or any combination thereof that includes functionality to obtain a model update from the model updater (114) or model updates from the training results receiver (112), to perform an overfitting analysis on the updated model, to receive information from a bandwidth analyzer (118) to determine if network bandwidth has fallen below a threshold, and/or to instruct client nodes to switch from one compressor (e.g., a sign compressor) to another compressor (e.g., a sign subset compressor) based on either analysis or any combination thereof. The function of the compression switch analyzer is discussed further in the description of FIG. 2A, FIG. 2C, and FIG. 2D, below.

In one or more embodiments, in order to perform analysis regarding whether to instruct client nodes to switch from one compressor to another, the compression switch analyzer (116) is also operatively connected to a bandwidth analyzer (118) and a validation database (120).

In one or more embodiments, a validation database (120) is data storage of any type (e.g., a data repository, as described above), that is configured to store information that may be used (e.g. by the compression switch analyzer (116)) in performing overfitting analysis for a given model (e.g., an updated model provided by the model updater (114), model updates provided by the training results receiver (112)). Such information may include the results of past validation losses determined for previous iterations of a model, which may be used in a regression analysis to fit a curve to the validation losses and check the value of the slope of the curve. In one or more embodiments, the slope of the curve determines whether or not the model is still generalizing well (i.e., whether or not it is overfitting the data).

In one or more embodiments, a bandwidth analyzer (118) is any hardware (e.g., circuitry), software, firmware, or any combination thereof that includes functionality to receive or otherwise obtain information regarding any network conditions that may affect or otherwise relate to network bandwidth between the model coordinator (100) and any one or more client nodes. In one or more embodiments, the bandwidth analyzer (118) includes functionality to use such information to determine whether any relevant connection has a network bandwidth that has fallen below a defined threshold. In one or more embodiments, if such a condition is detected, a bandwidth analyzer (118) includes functionality to communicate that fact to the compression switch analyzer (116) for use in analyzing whether to instruct client nodes to switch to a compressor that further compresses data being transmitted to the model coordinator (100) (e.g., to use a gradient sign subset vector instead of a gradient sign vector). In one or more embodiments, the bandwidth analyzer (118) also includes functionality to communicate network bandwidth information to the compression switch analyzer (116) after such a compression switch has already been instructed.

While FIG. 1B shows a configuration of components, other configurations may be used without departing from the scope of embodiments described herein. For example, although FIG. 1B shows all components as part of the same device, any of the components may be grouped in sets of one or more components which may exist and execute as part of any number of separate and operatively connected devices. As another example, a single component may be configured to perform all or any portion of the functionality performed by the components shown in FIG. 1B Accordingly, embodiments disclosed herein should not be limited to the configuration of components shown in FIG. 1B.

Figure 2A:
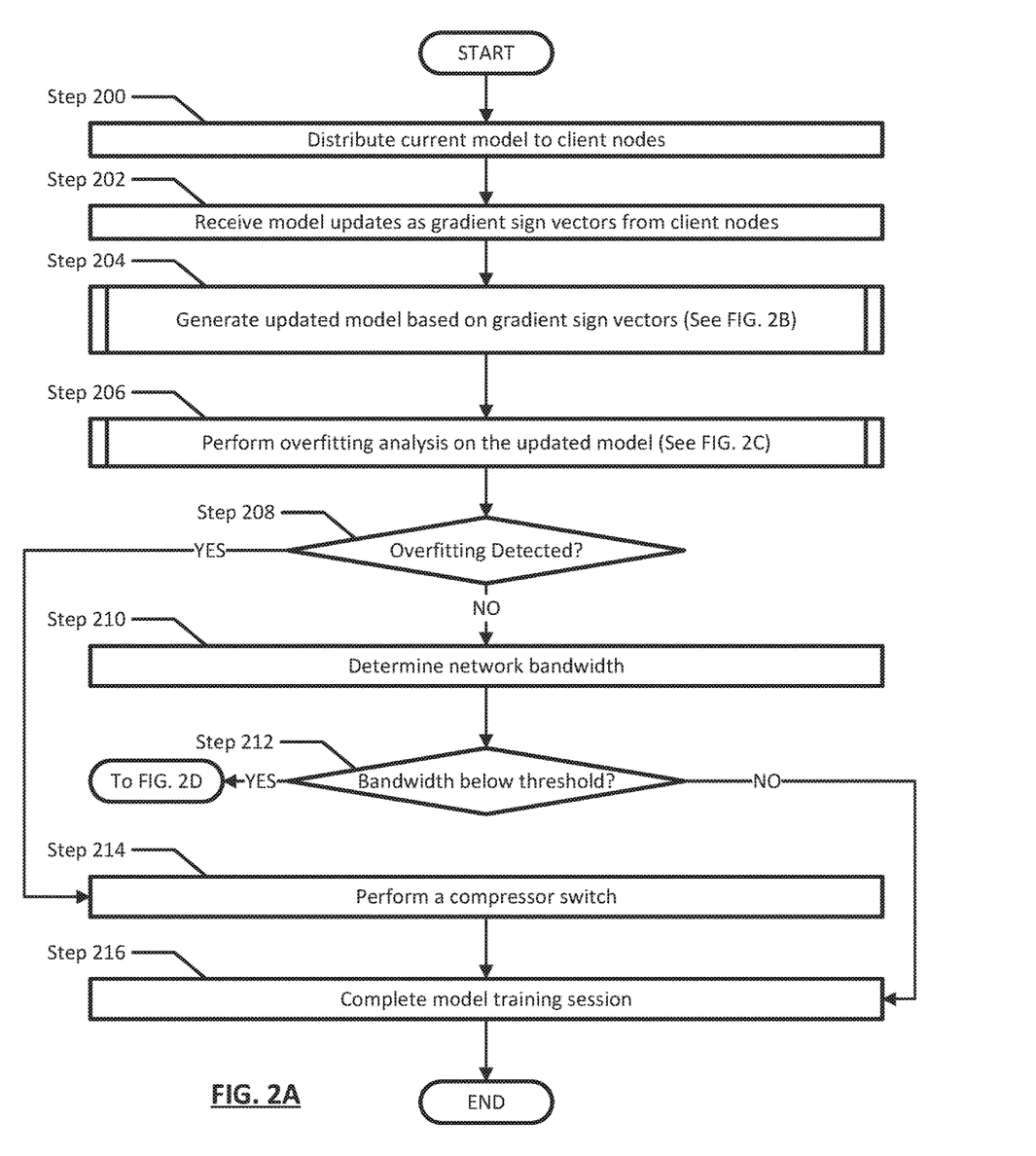
FIG. 2A shows a flowchart in accordance with one or more embodiments of the invention.

FIG. 2A shows a flowchart describing a method for compression switching during a training session in a federated learning environment in accordance with one or more embodiments disclosed herein.

Figure 2B:
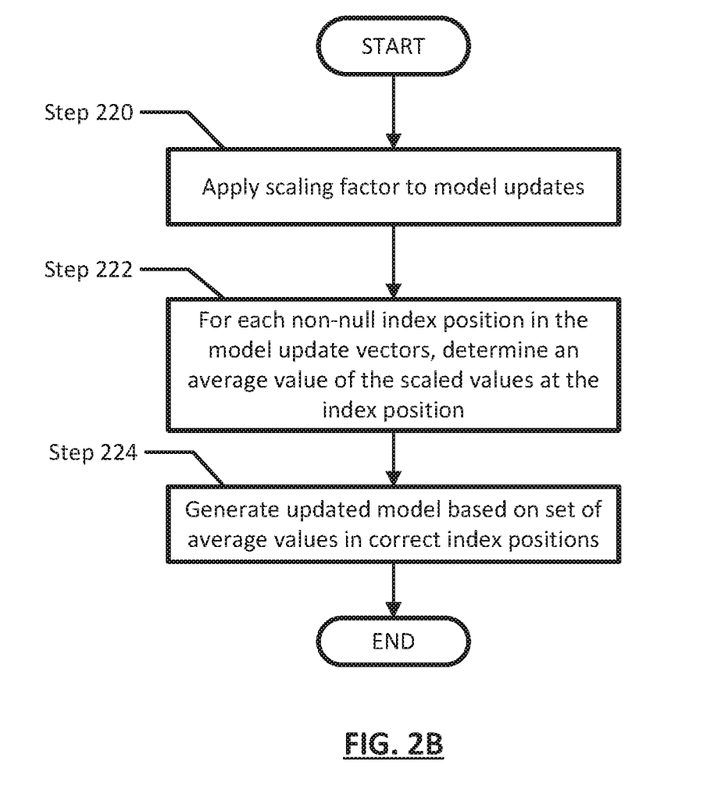
FIG. 2B shows a flowchart in accordance with one or more embodiments of the invention.
Figure 2C:
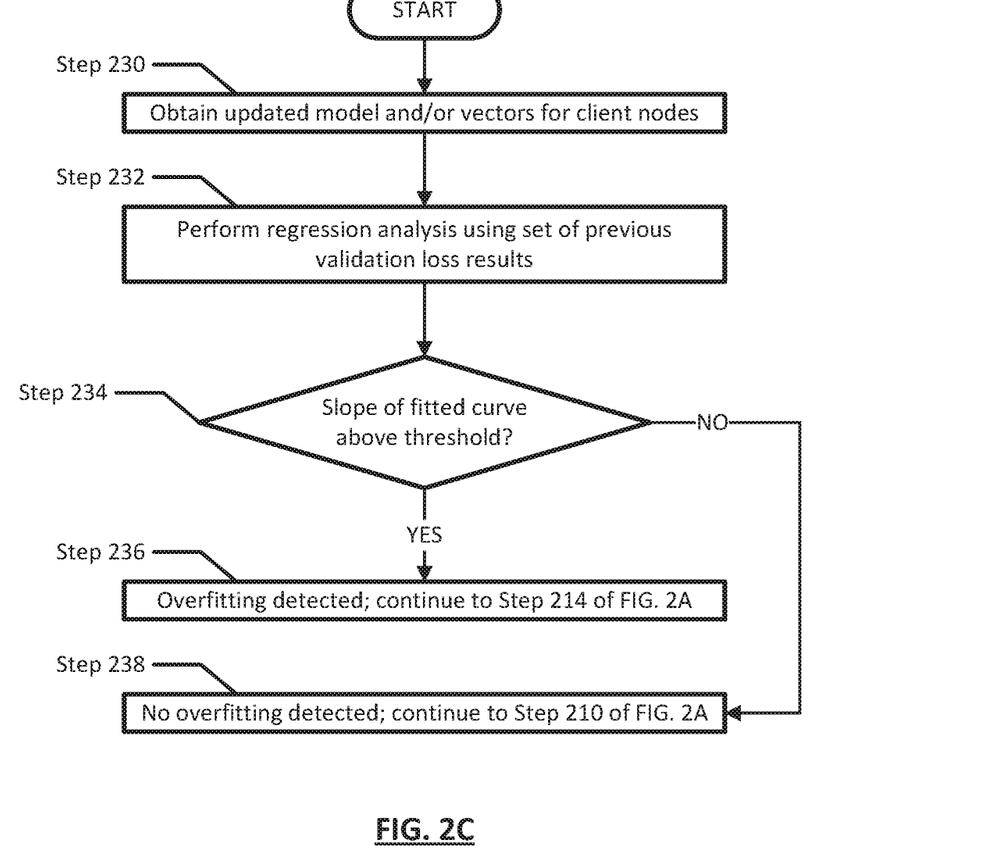
FIG. 2C shows a flowchart in accordance with one or more embodiments of the invention.
Figure 2D:
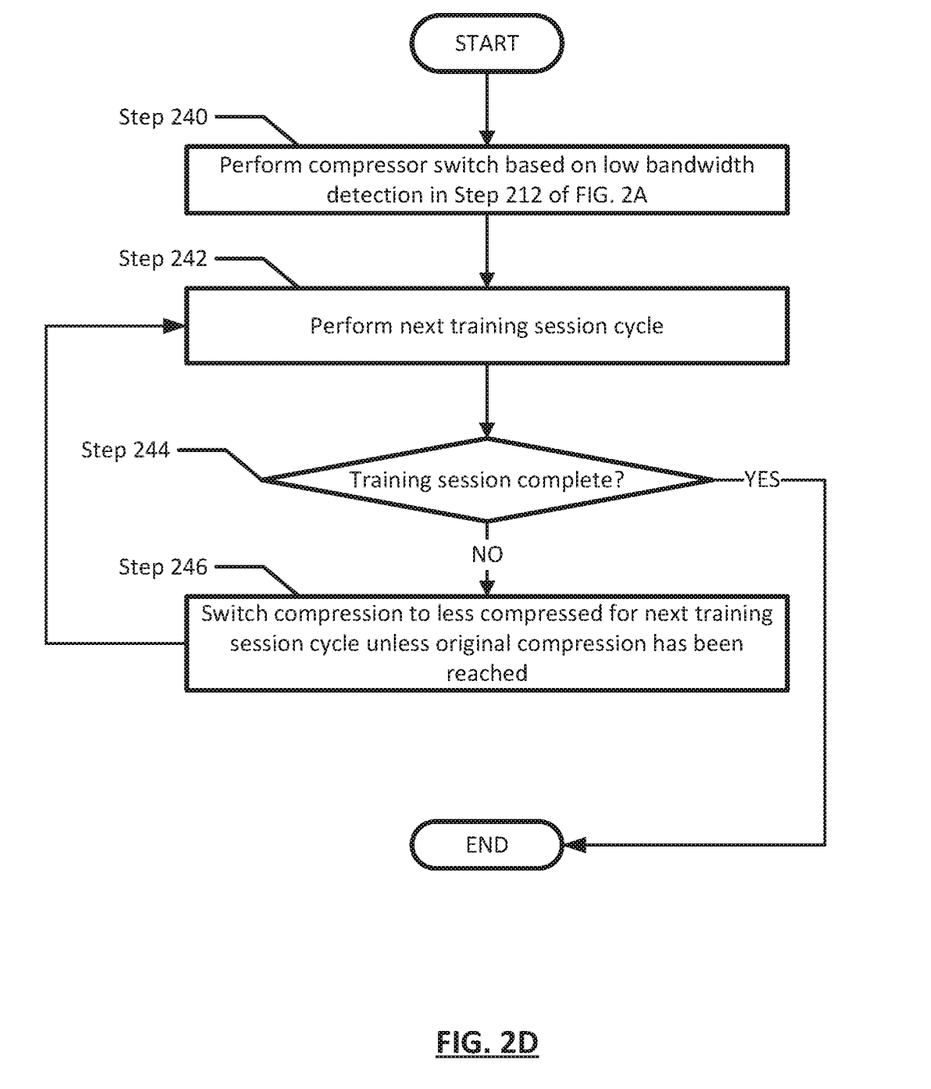
FIG. 2D shows a flowchart in accordance with one or more embodiments of the invention.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2A and/or with steps presented in FIG. 2B, FIG. 2C, and/or FIG. 2D.

In Step 200, a current model is distributed by a model coordinator to client nodes. In one or more embodiments, as described above, a model may be represented as a vector of values corresponding to a set of variables of a gradient vector. In one or more embodiments, if the current model is the initial model the values therein may be randomly initialized. In one or more embodiments, thereafter, during a training session, each subsequently distributed current model is an updated model generated as a result based on the gradient sign vectors or gradient sign subset vectors received from client nodes during a cycle of the training session. In one or more embodiments, the same current model is distributed to the client nodes. In one or more embodiments, the client nodes use their data to train the current model, which results in a gradient vector.

In Step 202, the model coordinator receives model updates from the client nodes. In one or more embodiments, the model updates are based on the gradient vectors generated by the client nodes after training the current model received in Step 200 using their data. The model update may be a gradient sign vector than includes a set of single bit values representing the signs of the gradients in the gradient vector when a sign compressor is being used. In one or more embodiments, a sign compressor is used at the beginning of a training session, and continues to be used until the model compressor instructs the client nodes to switch to a different compressor (e.g., a gradient sign subset compressor).

In Step 204, an updated model is generated using the gradient sign vectors from the client nodes. Updating the model to obtain an updated model is discussed in further detail in the description of FIG. 2B, below.

In Step 206, an overfitting analysis is performed using the updated model generated in Step 204, and/or any of the model updates received in Step 202. In one or more embodiments, the overfitting analysis assessed whether or not the updated model or given model update is overfitting a validation data set, and by how much, relative to past analysis of previous updated models or model updates relative to the validation data set. Overfitting analysis is discussed further in the description of FIG. 2C, below.

In Step 208, based on the analysis performed in Step 206, a determination is made as to whether overfitting is detected for the updated model. In one or more embodiments, if overfitting is not detected, the method proceeds to Step 210. In one or more embodiments, if overfitting is detected, the method proceeds to Step 214.

In Step 210, an analysis is performed regarding the network bandwidth conditions between the model coordinator and any or all of the client nodes. In one or more embodiments, such an analysis is performed by assessing any information relevant to network conditions, such as, for example, bandwidth. For example, a bandwidth analyzer of the model coordinator may monitor statistics such as throughput, traffic rate, latency, packet drops, etc. for network interfaces of the model coordinator to which client nodes are operatively connected.

In Step 212, a determination is made as to whether network bandwidth conditions have dropped below a defined threshold. Such a threshold may relate to the connections between the client nodes and the model coordinator, to any one connection between a client node and the model coordinator, or any combination thereof. A threshold may also have a time for which the bandwidth has remained below the threshold, or any other metric relevant to assessing the network conditions between the model coordinator and the client nodes. In one or more embodiments, if the bandwidth is determined to have fallen below a threshold, the method proceeds to FIG. 2D. In one or more embodiments, if the bandwidth has not fallen below such a threshold, the method proceeds to Step 216.

In Step 214, based on a determination that the updated model or any model update is overfitting, the model coordinator instructs one or more client nodes to switch compressors. In one or more embodiments, the switch is from using a compression scheme that communicates the signs of a gradient vector to a compression scheme that communicates only a subset of the signs of a gradient vector. In one or more embodiments, the subset, and therefore the additional level of compression, is determined by the shared random seed available to the client nodes and known to the model coordinator. In one or more embodiments, the compressor switch instruction is provided to each client node. Alternatively, in some embodiments, the model compressor may be configured to assess overfitting on a per-client node basis. In that case, the model coordinator may only instruct the overfitting client nodes to switch to the more compressed scheme. In such embodiments, the model coordinator may keep a record (e.g., a set of flags) that records which compressor each client node is using for use when updating the model (as discussed in the description of FIG. 2B).

In Step 216, the model training session continues until completion (i.e., the defined number of cycles in the epoch are completed). In one or more embodiments, once overfitting is detected for the updated model, or for the gradient sign vectors received from any client node, the compressor that was switched to in Step 214 is used for the remainder of the training session for the client nodes that were instructed to make the switch. In one or more embodiments, starting with a compressor that compresses less allows for more information to be used, which may allow for less error when a model is applied to a given data set. However, having mode information requires more network bandwidth, and may lead to overfitting. In one or more embodiments, switching to a compression scheme to further compresses the results of the client node training results (e.g., using a gradient sign subset vector based on a shared random seed) addresses, at least in part, the bandwidth limitations, while also helping to avoid overfitting.

FIG. 2B shows a flowchart describing a method for generating an updated model using gradient sign vectors and/or gradient sing subset vectors from client nodes in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a model coordinator applies a scaling factor to model updates received from client nodes. The model updates may be gradient sign vectors, or gradient sign subset vectors. In one or more embodiments, if the model update is a gradient sign vector, then the scaling factor is applied to each element in the vector. For example, if the gradient sign vector is a set of zeroes representing negative signs and ones representing positive signs, and the scaling factor is 0.1, then a gradient sign vector {1; 0; 0; 1; 1; 1; 0; 1} becomes {0.1; −0.1; −0.1; 0.1; 0.1; 0.1; −0.1; 0.1}. In one or more embodiments, if the model update is a gradient sign subset vector the same process applies, but only as to the vector elements for which a sign value is received. For example, if the gradient sign subset vector is {0; 1; 0; 1; 1}, and the model coordinator knows that the random seed for the increased compression dictated that the third, fifth and eighth element were not transmitted, then the vector may be viewed as {0; 1; null; 0; null; 1; 1; null}. In one or more embodiments, the null values are not actually represented in the gradient sign subset vector, but may be ascertained by the model coordinator based on knowledge of the random seed used to generate it. In one or more embodiments, applying the scaling factor to a gradient sign subset vector applies the scaling factor only to values included in the gradient sign subset vector. Such a scaling factor application, combined with knowledge of where the sign values fall (i.e., the index position) within the gradient vector from which they were derived, allows the scaled values to be used in Step 222.

In Step 222, for each non-null index position in the model update vectors, an average value of the scaled values at the index position is determined. Said another way, for each value that exists at a given vector position is used to determine the average. In one or more embodiments, if a given vector has no value at a given index position (i.e., in a gradient sign subset vector), then that vector does not contribute to the average value for the index position.

In Step 224, an updated model is generated based on the average values at each index position in the vector. For example, if all 10 model updates from the client nodes include a value for the third index position, then the average value in the updated model is the average of the 10 scaled values of that index position. Correspondingly, if only seven of the model updates have a value at the fifth index position, the average value for that index position will be the average of the seven values, with the three vectors not having a value at that position not contributing to the model update as to that index position.

FIG. 2C shows a flowchart describing a method for determining whether a given model update is overfitting validation data in order to determine if one or more client nodes should switch from using a gradient sign vector to communicate model updates to using a gradient sign subset vector.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 230, an updated model and/or one or more model updates from client nodes are obtained. In one or more embodiments, performing an overfitting analysis on an updated model or a given model update determines whether the updated model aggregated from the various model updates provided by the client nodes is overfitting when presented with a validation data set. In one or more embodiments, such an analysis may additionally or alternatively be performed using a model update from one or more particular client nodes to determine if their model training is overfitting the private training data of the client node.

In Step 232, a regression analysis is performed using a history of validation loss values for whatever model is being analyzed. In one or more embodiments, such an analysis includes fitting a curve to a specified number of previous validation values, and determining the slope of the fitted curve.

In Step 234, a determination is made as to whether the slope is above threshold (e.g., zero). In one or more embodiments, if the slope is above or equal to the threshold, the method proceeds to Step 236. In one or more embodiments, if the slop of the fitted curve is not above the threshold, the method proceeds to Step 238.

In Step 236, based on the slope being above or equal to the threshold, overfitting is detected. Accordingly, the method proceeds to Step 214 of FIG. 2A, and one or more client nodes are instructed to begin using gradient sign subset vectors to communicate model updates for the remainder of the training cycle.

In Step 238, based on the slope being less than the threshold, no overfitting was detected. Accordingly, the method returns to Step 210 of FIG. 2A.

FIG. 2D shows a flowchart describing a method for continuing a training session after a low bandwidth detection in accordance with one or more embodiments described herein While the various steps in the flowchart shown in FIG. 2D are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 240, a compressor switch is performed based on detection of a low bandwidth condition in Step 212 of FIG. 2A. In one or more embodiments, the compressor switch is from a client node using a gradient sign vector to using a gradient sign subset vector to further reduce the amount of information that is transmitted when communicating a model update to a model coordinator. As discussed above, the amount of additional compression depends on the shared random seed used to determine which index positions of a gradient vector are not sent as part of the model update from a client node.

In Step 242, the next training session cycle is performed using the new compressor, resulting in a lower bandwidth requirement to transmit the model update.

In Step 244, a determination is made as to whether the training session is complete. In one or more embodiments, if the training session is complete, the process ends, and no additional compressor switches are made based on network bandwidth conditions between the model coordinator and the client nodes. In one or more embodiments, if the training session is not complete, the method proceeds to Step 246.

In Step 246, an additional compressor switch may be performed. In one or more embodiments, each pass through Step 246 changes the level of compression being used from the decreased compression used in Step 240 to a compression level that is closer to the compression level of the sign compressor from which the compressor switch was made when the low network bandwidth conditions were detected. For example, if the shared random seed dictated that 10% of the signs of a gradient vector were to be shared instead of 100% of the signs (as in a gradient sign vector), then after the training session using the 10% gradient sign subset vector completes, the compression of the gradient sign subset vector may be increased to 20%. In one or more embodiments, such an reduction of compression (i.e., increase in the percentage of signs included from a gradient vector in a gradient sign subset vector) continues in pre- defined increments each cycle until the training session ends, or the original level of compression of the gradient sign compressor is reached.

Although not shown in FIG. 2D, in one or more embodiments, the overfitting analysis discussed in the Descriptions of FIG. 2A and FIG. 2C is still performed for each cycle of the training session, even if the steps of FIG. 2D are being performed. As such, in one or more embodiments, if overfitting is detected, the low bandwidth detection is overridden by the overfitting detection, and the original gradient sign subset vector compression scheme is reverted to for the remainder of the training session for one or more client nodes for which overfitting was detected.

Example Use Case

The above describes systems and methods for compressor switching between gradient sign compression (i.e., 1 bit for each sign of a gradient value in a gradient vector) and gradient sign subset compression (i.e., transmitting a value representing the sign of only a subset of the gradient values based on a shared random seed). Such embodiments are intended to scale for use in model training scenarios that produce gradient vectors with any number of gradient value elements (e.g., hundreds, thousands, millions, billions, etc.). However, for the sake of brevity and simplicity, consider the following scenario to illustrate the concepts described herein.

A model coordinator is configured to perform federated learning services in conjunction with 10 client nodes, with each node being a neural network with a number of layers between the input layer and the output layer. In such a scenario, an initial model is sent to the client nodes to begin a training cycle. Each client node executes a gradient descent algorithm to train the model on its own private data. The output of the training is a gradient vector that includes 10 gradients corresponding to 10 variables relevant to predicting an output based on input data. In other words, the gradient vector has 10 elements.

To send a gradient vector with 10 values, each represented by a 32 bit data item would require 320 bits of data. To do so from each of 10 nodes would require 3200 bits of data to be sent to the model coordinator.

As an initial level of compression, instead of the actual value of the gradients in the gradient vector, each client node is initially configured to send only the signs of the gradient values, with negative gradients represented by a 0, and positive gradient values represented by a 1.

For example, a given client node may produce a gradient vector for a given cycle during the training session, such as:
{−1.500; 9.200; −1.600; 0.027; −4.300; −1.700; 2.300; −6.420; 2.188; −0.075}

Using the sign compressor, the gradient sign vector becomes:
{0; 1; 0; 1; 0; 0; 1; 0; 1; 0}

Thus, the information transmitted per client node to communicate results of a model training as a model update has been reduced by a factor of 32, from 320 bits to 10 bits. Each of the 10 client nodes similarly transmits a 10 element gradient sign vector to the model coordinator.

Next, the model coordinator applies a scaling factor of 0.1 to each of the sign values in the gradient sign vector. For example, the above shown gradient sign vector would be scaled to:
{−0.1; 0.1; −0.1; 0.1; −0.1; −0.1; 0.1; −0.1; 0.1; −0.1}

The same scaling factor would be applied to each gradient sign vector received by the model coordinator during the cycle. For each position (i.e., index location) within the scaled gradient sign vectors, the scaled factors are averaged to determine an average scaled value for that index position. The result is a vector of averages of scaled gradient sign values, which is the updated model. The updated model is distributed to the client nodes for use in the next cycle of the training session.

For each cycle, an overfitting analysis may be performed for each client node. If no overfitting is detected based on an analysis of a set of past validation losses, and no network bandwidth conditions are detected that are below a bandwidth threshold, then the next cycle occurs the same way, and the cycles continue until the training session is complete.

However, if the overfitting analysis indicates that one or more client nodes are overfitting to their own private data, and thus not generalizing well to a validation data set, then those client nodes are provided an instruction from the model compressor to switch compressors from the gradient sign compressor to a gradient sign subset compressor. In this scenario, the shared random seed was provided to the client nodes with the initial model, and is known to the model coordinator. Therefore, for those nodes, upon completion of their training during the next cycle, they provide to the model coordinator a gradient sign subset vector, which only includes sign values for a subset of the gradients of the gradient vector, with the subset being commonly defined by the shared random seed.

Because the model coordinator knows the shared random seed, it is able to ascertain the index positions of the values in the gradient sign subset vectors received from the nodes that were overfitting. Therefore, the calculation of the average values for the updated model produced by the cycle will be affected by the gradient sign subset vectors only for the index positions for which a value was communicated to the model coordinator. Accordingly, the negative impact that the overfitting client nodes have on the generalization capabilities of the updated model generated by the model coordinator for the cycle is mitigated. Any client node instructed to switch to using a gradient sign subset vector will continue to do so for all remaining cycles in the training session.

Next, consider a scenario where instead of overfitting being detected, it is detected that a connection between a client node and the model coordinator falls below a defined quality threshold. Similar to what is described above, the model coordinator may communicate to the client node to switch to the gradient sign subset vector compressor to be able to still get relevant model updates from the client node. However, unlike the overfitting scenario, the client node may not necessarily have to use the same gradient sign subset compressor for the remaining cycles in the training session. Instead, the compression factor may be iteratively reduced each cycle, until the compression returns to the full gradient sign vector compressor, assuming network conditions support such iterative increases in amount of information being transmitted from the client node to the model coordinator. This iterative increase in the percentage of gradient signs may be halted, however, if overfitting is detected, in which case the client node is instructed to return to the base gradient sign subset vector compressor for the remainder of the training cycle.

Figure 3:
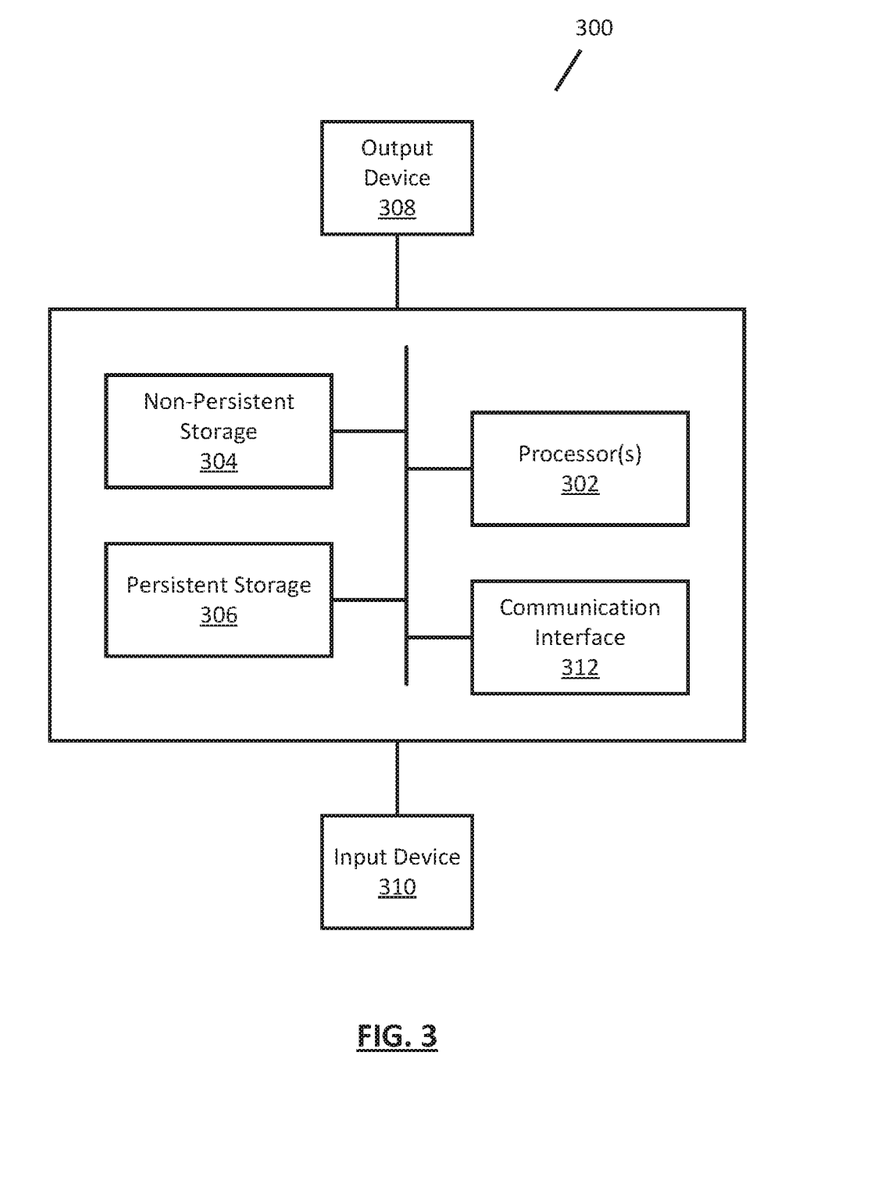
FIG. 3 shows a computing system in accordance with one or more embodiments of the invention.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for compression switching during model training, the method comprising:
   distributing, by a model coordinator, a current model to a plurality of client nodes comprising a client node, wherein the client node uses the current model to generate a gradient vector based on a client node data set;
   receiving, from the client node, a first model update comprising a gradient sign vector based on the gradient vector;
   generating, by the model coordinator, a first updated model using the gradient sign vector;
   distributing the first updated model to the plurality of client nodes, wherein the client node uses the first updated model to generate a second gradient vector based on a second client node data set;

making a first determination, by the model coordinator and after distributing the first updated model, that a compression switch condition exists corresponding to the client node;

based on the first determination, transmitting, from the model coordinator, an instruction to the client node to perform a compression switch;

receiving, by the model coordinator, from the client node, and in response to the instruction, a second model update comprising a gradient sign subset vector based on the second gradient vector;

generating, by the model coordinator, a second updated model using the gradient sign subset vector; and distributing the second updated model to the plurality of client nodes.

2. The method of claim 1, wherein the compression switch condition comprises a second determination that the client node is overfitting the current model.

3. The method of claim 2, wherein the second determination comprises determining that the client node is overfitting based on an analysis of past validation losses.

4. The method of claim 1, wherein the compression switch condition comprises a second determination that network conditions have fallen below a network conditions threshold.

5. The method of claim 1, wherein generating, by the model coordinator, the first updated model using the gradient sign vector comprises applying a scaling factor to the gradient sign vector.

6. The method of claim 1, wherein generating, by the model coordinator, the second updated model using the gradient sign subset vector comprises applying a scaling factor to non-null values of the gradient sign subset vector.

7. The method of claim 1, wherein, before receiving, from the client node, the first model update comprising the gradient sign vector based on the gradient vector, a shared random seed is transmitted from the model coordinator to the client node.

8. The method of claim 7, wherein generating, by the model coordinator, the second updated model using the gradient sign subset vector comprises using the shared random seed to identify index positions associated with the gradient sign subset vector.

9. A non-transitory computer readable medium comprising computer readable program code, which when executed by a computer processor enables the computer processor to perform a method for compression switching during model training, the method comprising:

distributing, by a model coordinator, a current model to a plurality of client nodes comprising a client node, wherein the client node uses the current model to generate a gradient vector based on a client node data set;

receiving, from the client node, a first model update comprising a gradient sign vector based on the gradient vector;

generating, by the model coordinator, a first updated model using the gradient sign vector;

distributing the first updated model to the plurality of client nodes, wherein the client node uses the first updated model to generate a second gradient vector based on a second client node data set;

making a first determination, by the model coordinator and after distributing the first updated model, that a compression switch condition exists corresponding to the client node;

based on the first determination, transmitting, from the model coordinator, an instruction to the client node to perform a compression switch;

receiving, by the model coordinator, from the client node, and in response to the instruction, a second model update comprising a gradient sign subset vector based on the second gradient vector;

generating, by the model coordinator, a second updated model using the gradient sign subset vector; and distributing the second updated model to the plurality of client nodes.

10. The non-transitory computer readable medium of claim 9, wherein the compression switch condition comprises a second determination that the client node is overfitting the current model.

11. The non-transitory computer readable medium of claim 10, wherein the second determination comprises determining that the client node is overfitting based on an analysis of past validation losses.

12. The non-transitory computer readable medium of claim 9, wherein the compression switch condition comprises a second determination that network conditions have fallen below a network conditions threshold.

13. The non-transitory computer readable medium of claim 9, wherein generating, by the model coordinator, the first updated model using the gradient sign vector comprises applying a scaling factor to the gradient sign vector.

14. The non-transitory computer readable medium of claim 9, wherein generating, by the model coordinator, the second updated model using the gradient sign subset vector comprises applying a scaling factor to non-null values of the gradient sign subset vector.

15. The non-transitory computer readable medium of claim 9, wherein, before receiving, from the client node, the first model update comprising the gradient sign vector based on the gradient vector, a shared random seed is transmitted from the model coordinator to the client node.

16. The non-transitory computer readable medium of claim 15, wherein generating, by the model coordinator, the second updated model using the gradient sign subset vector comprises using the shared random seed to identify index positions associated with the gradient sign subset vector.

17. A system for compression switching during model training, the system comprising:

a model coordinator, executing on a processor comprising circuitry, and configured to:

distribute a current model to a plurality of client nodes comprising a client node, wherein the client node uses the current model to generate a gradient vector based on a client node data set;

receive, from the client node, a first model update comprising a gradient sign vector based on the gradient vector;

generate a first updated model using the gradient sign vector;

distribute the first updated model to the plurality of client nodes, wherein the client node uses the first updated model to generate a second gradient vector based on a second client node data set;

make a first determination, after distributing the first updated model, that a compression switch condition exists corresponding to the client node;

transmit, based on the first determination, an instruction to the client node to perform a compression switch;

receive, from the client node, and in response to the instruction, a second model update comprising a gradient sign subset vector based on the second gradient vector;
generate a second updated model using the gradient sign subset vector; and
distribute the second updated model to the plurality of client nodes.

18. The system of claim 17, wherein the compression switch condition comprises a second determination that the client node is overfitting the current model.

19. The system of claim 18, wherein the second determination comprises determining that the client node is overfitting based on an analysis of past validation losses.

20. The system of claim 17, wherein the compression switch condition comprises a second determination that network conditions have fallen below a network conditions threshold.

\* \* \* \* \*